United States Patent [19]

Suzuki et al.

[11] Patent Number: 5,083,074

[45] Date of Patent: Jan. 21, 1992

[54] METHOD FOR ERROR CORRECTION IN SYNCHRONIZED SUPERPOSED OPERATION OF SERVOMOTORS

[75] Inventors: Hironori Suzuki; Teruaki Ikutame, both of Aichi, Japan

[73] Assignee: Mitsubishi Denki Kabushiki Kaisha, Tokyo, Japan

[21] Appl. No.: 571,355

[22] Filed: Aug. 22, 1990

[30] Foreign Application Priority Data

Nov. 30, 1989 [JP] Japan ................... 1-309299

[51] Int. Cl.$^5$ .............................. G05B 11/32
[52] U.S. Cl. .................. 318/625; 318/571; 318/39; 318/616; 314/69; 364/474.15
[58] Field of Search .......... 318/625, 571, 39, 616; 314/69; 364/474.15

[56] References Cited

U.S. PATENT DOCUMENTS

| | | | |
|---|---|---|---|
| 3,586,222 | 6/1971 | Rosen | 314/69 X |
| 4,629,956 | 12/1986 | Nozawa et al. | 318/625 |
| 4,879,660 | 11/1989 | Asakura et al. | 318/571 X |

Primary Examiner—William M. Shoop, Jr.
Assistant Examiner—Saul M. Bergmann
Attorney, Agent, or Firm—Rothwell, Figg, Ernst & Kurz

[57] ABSTRACT

In a method for performing a synchronized superposed operation of two servomotors, controllers for the servomotors perform the control for achieving the synchronized superposed operation by: calculating, for each of the servomotors, the difference, or differences, between the ideal speed and/or position deviations obtained from a control command and the actual speed and/or position deviations obtained from the rotation of the servomotor; calculating a speed correction quantity, or a speed correction quantity and a current correction quantity, from the discrepancy, or discrepancies, between the differences calculated for both of the servomotors; and adding the correction quantity, or quantities, to a speed command, or to a speed command and a current command, given to the subsidiary shaft side. Thus, a synchronized superposed operation of servomotors in which speeds and responses of the main shaft and the subsidiary shaft are well balanced therebetween can be achieved.

2 Claims, 3 Drawing Sheets

METHOD FOR ERROR CORRECTION IN SYNCHRONIZED SUPERPOSED OPERATION OF SERVOMOTORS

BACKGROUND OF THE INVENTION

1. Field of the Invention

The present invention relates to a method for error correction in a synchronized superposed operation of two servomotors for the main shaft and subsidiary shaft for machine tools, for example, and more particularly relates to a method for error correction in a synchronized superposed operation of such servomotors, in which a speed command and a current command given to the servomotor on the subsidiary shaft side are corrected using the errors between ideal position deviation and actual position deviation for position and speed of the two shafts.

2. Description of the Prior Art

FIG. 1 is a block diagram of a control system for a two-shaft arrangement of a servomotor controller in the prior art. Referring to the diagram, reference character $1a_1$ denotes a servo control system for the first shaft, $2a$ denotes a target position command $\theta_{ra}$ input to the first shaft servo control system $1a_1$, $3a$ denotes a position loop gain $K_{pa}$ becoming the position response to the target position command $\theta_{ra}$ ($2a$), $4a$ denotes a speed command $V_{ra}$ into which the target position command $\theta_{ra}$ ($2a$) is transformed after being passed through the position loop gain $K_{pa}$ ($3a$), $5a$ denotes a speed loop gain $K_{va}$ becoming the speed response to the speed command $V_{ra}$ ($4a$), $6a$ denotes a current command $I_{ra}$ into which the speed command $V_{ra}$ ($4a$) is transformed after being passed through the speed loop gain $K_{va}$ ($5a$), $7a$ denotes a current loop gain $K_{ia}$ becoming the current response to the current command $I_{ra}$ ($6a$), $8a$ denotes an actual current $I_{fa}$ into which the current command $I_{ra}$ ($6a$) is transformed after being passed through the current loop gain $K_{ia}$ ($7a$), $9a$ denotes a torque constant $K_{Ta}$ as a relational constant between the motor current and the output torque for the first shaft, $10a$ denotes the sum total of the motor rotor inertia $J_{Ma}$ and the load inertia $J_{La}$ indicative of the load applied to the first shaft of the motor, $11a$ denotes an integrating term for converting a current into a speed in the servo control system, $12a$ denotes an actual speed $V_{fa}$ obtained after being passed through the integrating term $11a$, $13a$ denotes an integrating term for converting a speed into a position in the servo control system, and $14a$ denotes an actual position $\theta_{fa}$ into which the speed $V_{fa}$ ($12a$) is transformed after being passed through the integrating term ($13a$). Similarly, reference character $1b_1$ denotes a servo control system for the second shaft, $2b$ denotes a target position command $\theta_{rb}$, $3b$ denotes a position loop gain $K_{pb}$, $4b$ denotes a speed command $V_{rb}$, $5b$ denotes a speed loop gain $K_{vb}$, $6b$ denotes a current command $I_{rb}$, $7b$ denotes a current loop gain $K_{ib}$, $8b$ denotes an actual current $I_{fb}$, $9b$ denotes a torque constant $K_{Tb}$, $10b$ denotes the sum total of the motor rotor inertia $J_{Mb}$ and the load inertia $J_{Lb}$, $11b$ denotes an integrating term, $12b$ denotes an actual speed $V_{fb}$, $13b$ denotes an integrating term, and $14b$ denotes an actual position $\theta_{fb}$. As other elements arranged outside these loops of the control system for the first shaft, $15a$ denotes an ideal position loop for calculating the ideal position of the first shaft, $16a$ denotes a position loop gain $K_{pa}$ inside the ideal position loop $15a$, $17a$ denotes its integrating term, and $18a$ denotes an ideal position $\theta_{fa0}$, and similarly, $15b$ denotes an ideal position loop for the second shaft, $16b$ denotes a position loop gain $K_{pb}$, $17b$ denotes its integrating term, and $18b$ denotes an ideal position $\theta_{fb0}$. Further, $31a$ to $34a$ and $31b$ to $34b$ each denote a subtractor for subtracting an input signal on the ($-$) side from the input signal on the ($+$) side thereby outputting the difference.

Now, the operation of the arrangement of FIG. 1 will be described. Upon receipt of the target position command $\theta_{ra}$ ($2a$) input to the servo control system $1a_1$ for the first shaft and the present actual position $\theta_{fa}$ ($14a$) fed back from the integrating term $13a$, the subtractor $31a$ calculates a position deviation ($\theta_{ra} - \theta_{fa}$) as the difference between the two signals. The calculated position deviation is multiplied by the position loop gain $K_{pa}$ ($3a$) and thereby the speed command $V_{ra}$ ($4a$) is obtained. Similar to the case of the position deviation, the difference between this speed command and the present actual speed $V_{fa}$ ($12a$) fed back from the integrating term $11a$ $V_{fa} - V_{fa}$, is calculated by the subtractor $32a$ and thereby the speed deviation $V_{ra} - V_{fa}$ is obtained. The calculated speed deviation is multiplied by the speed loop gain $K_{va}$ ($5a$) and thereby the current command $I_{ra}$ ($6a$) is obtained. Also, the difference between this current command and the fed back present actual current $I_{fa}$ ($8a$), $I_{ra} - I_{fa}$, is calculated by the subtractor $33a$. This current difference is multiplied by the current loop gain $K_{ia}$ ($7a$) and thereby the actual current $I_{fa}$ ($8a$) actually flowing through the motor is generated. The generated current $I_{fa}$ ($8a$) produces a torque proportional thereto to rotate the motor, the produced torque being dependent on the torque constant $K_{Ta}$ ($9a$). The thus produced torque, in reality, works as motive power after being attenuated by the sum total $10a$ of the rotor inertia $J_{Ma}$ and the load inertia $J_{La}$ as the load applied to the motor, and if this is considered in terms of the servo system, the torque after being integrated by the integrating term $11a$ becomes the speed $V_{fa}$ ($12a$), and the speed $V_{fa}$ being integrated by the integrating term $13a$ becomes the position $\theta_{fa}$ ($14a$). As apparent from the diagram, the current, speed, and position are respectively provided with loops whereby they are separately loop-controlled.

Apart from the above described control loops, the ideal position loop $15a$ calculates the ideal position $\theta_{fa0}$ ($18a$) by means of the position loop gain $16a$ having the same value as the position loop gain $K_{pa}$ ($3a$) and the integrating term $17a$. More specifically, in the ideal position loop $15a$, the subtractor $34a$ detects the difference between the position command $\theta_{ra}$ ($2a$) and the ideal position $\theta_{fa0}$ ($18a$), this difference is multiplied by the position loop gain $K_{pa}$ ($16a$), and this product is integrated by the integrating term $17a$, whereby the ideal position $\theta_{fa0}$ ($18a$) is calculated. Separate from the just described ideal position calculation, there is provided a check-loop function, whereby the difference between the target position command $\theta_{ra}$ ($2a$) and the actual position $\theta_{fa}$ ($14a$) is monitored at all times and it is watched whether or not the motor as the object of control is normally operating, in consideration of the dynamic characteristics of the servo system, and in the event that this difference becomes too great, an alarm is given to signal the occurrence of a malfunction. The ideal position loop $15b$ operates quite the same as the ideal position loop $15a$.

The control system $1b_1$ for the second shaft operates quite the same as the control system for the first shaft. Even during the synchronized superposed operation bearing a mutual relationship between the two shafts, there is nothing existing in the system on one side to affect the control system on the other side and each system operates independently. The dynamic operations of each shaft are determined by the position loop gains $K_{pa}$ (3a), $K_{pb}$ (3b), speed loop gains $K_{va}$ (5a), $K_{vb}$ (5b), current loop gains $K_{ia}$ (7a), $K_{ib}$ (7b), torque constants $K_{Ta}$ (9a), $K_{Tb}$ (9b), and $J_{Ma}+J_{La}$ (10a), $J_{Mb}+J_{Lb}$ (10b) as loads. Therefore, even if the same commands are given to the systems for the first shaft and the second shaft, there arise some errors between the two shafts so far as there are some differences between the above mentioned factors determined by the dynamic operations.

Since servomotor controllers of the prior art were constructed as described above, there have been such problems that the controllers are provided with no function for balancing relative operations and responses between the shafts of two servomotors and, since it is required that operations and responses are well balanced in each servomotor for achieving a satisfactory synchronized superposed operation, it is difficult for the controllers each to detect errors occurring between shafts and, hence, it is very difficult to adjust each of the control elements

SUMMARY OF THE INVENTION

The present invention has been made to solve the above mentioned problems. Accordingly, it is an object of the present invention to provide a method for error correction in a synchronized superposed operation of two servomotors, in which errors between two shafts of servomotors are automatically detected and responses of the servomotor on the auxiliary shaft side are corrected according to the detected errors, so that operations and responses of both the shafts are well balanced therebetween.

In order to achieve the above mentioned object, a method for error correction in a synchronized superposed operation of servomotors as an aspect of the present invention comprises the steps of:

calculating, in a first controller for controlling a first servomotor for the main shaft, the difference between an ideal position deviation obtained from a control command and an actual position droop obtained from the rotation of the first servomotor, as a first position deviation difference;

calculating, in a second controller for controlling a second servomotor for the subsidiary shaft, the difference between an ideal position deviation obtained from a control command and an actual position deviation obtained from the rotation of the second servomotor, as a second position deviation difference;

calculating a speed correction quantity from a discrepancy between the first position deviation difference and the second position deviation difference; and adding the speed correction quantity to a speed command in the second controller.

Further a method for error correction in a synchronized superposed operation of servomotors as another aspect of the present invention comprises the steps of:

calculating, in a first controller for controlling a first servomotor for the main shaft, both differences between an ideal position deviation obtained from a control command and an actual position deviation obtained from rotation of the first servomotor, and between an ideal speed deviation obtained from the control command and an actual speed deviation obtained from the rotation of the first servomotor, as a first position deviation difference and a first speed deviation difference, respectively;

calculating, in a second controller for controlling a second servomotor for the subsidiary shaft, both differences between an ideal position deviation obtained from a control command and an actual position deviation obtained from rotation of the second servomotor, and between an ideal speed deviation obtained from the control command and an actual speed deviation obtained from the rotation of the second servomotor, as a second position deviation difference and a second speed deviation difference, respectively;

calculating a speed correction quantity from a discrepancy between the first position deviation difference and the second position deviation difference and a current correction quantity from a discrepancy between the first speed deviation difference and the second speed deviation difference; and adding the speed correction quantity to a speed command in the second controller and the current correction quantity to a current command in the second controller.

The above and other objects and novel features of the present invention will be better understood from the following detailed description taken in connection with the accompanying drawings.

BRIEF DESCRIPTION OF THE DRAWINGS

FIG. 3 is a block diagram of control systems for two shafts in a servomotor controller showing another embodiment of the present invention.

DETAILED DESCRIPTION OF THE PREFERRED EMBODIMENTS

Figure 1:
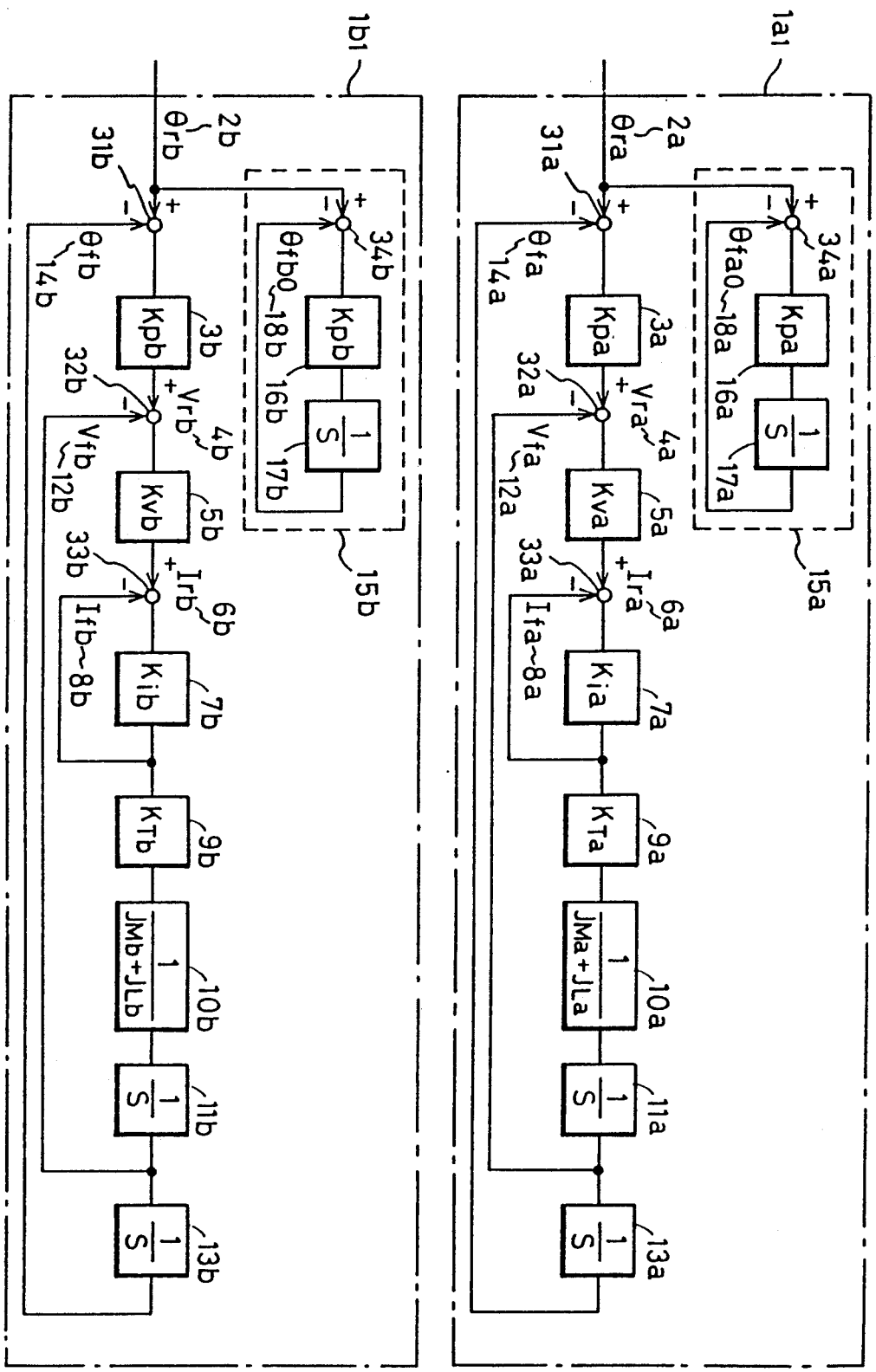
FIG. 1 is a block diagram of control systems for two shafts in a servomotor controller of a prior art example.
Figure 2:
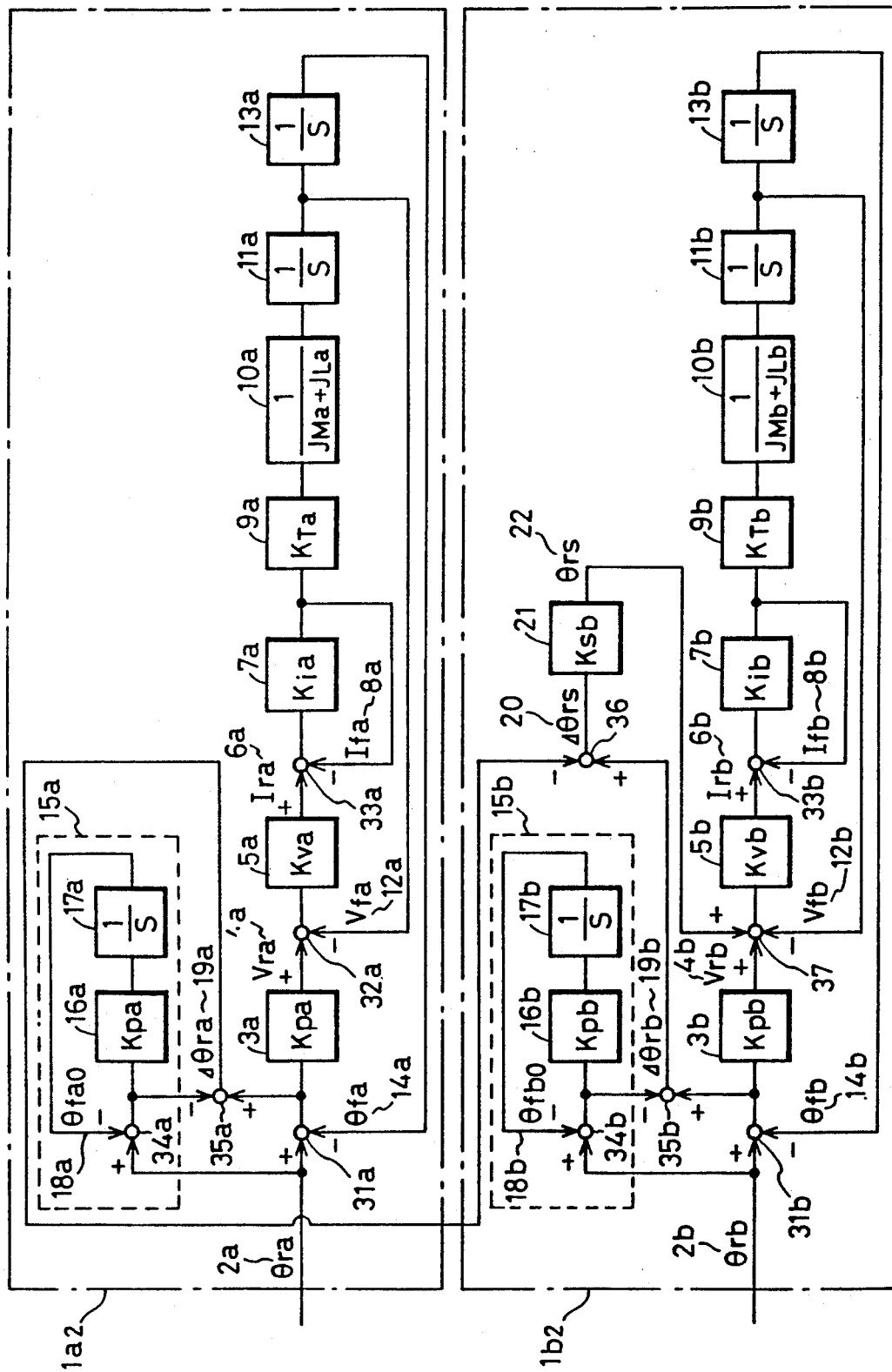

FIG. 2 is a block diagram of control systems for two shafts in a servomotor controller showing an embodiment of the present invention. Referring to the diagram, elements denoted by reference characters 2a to 18a, 2b to 18b, 31a to 34a, 31b, 33b, and 34b are the same as those in FIG. 1. Reference character 1a₂ denotes the servo control system for the first shaft in the present embodiment, 1b₂ denotes the servo control system for the second shaft in the present embodiment, 19a denotes the difference $\Delta\theta_{ra}$ between the ideal position deviation and the actual position deviation of the first shaft, 19b similarly denotes the ideal/actual position deviation difference $\Delta\theta_{rb}$ of the second shaft, 20 denotes the discrepancy $\Delta\theta_{rs}$ between the ideal/actual position deviation difference 19a of the first shaft and the ideal/actual position deviation difference 19b of the second shaft, 21 denotes a correction gain $K_{sb}$ by which the aforesaid discrepancy $\Delta\theta_{rs}$ (20) is to be multiplied, 22 denotes $\theta_{rs}$ as a correction quantity, 35a, 35b, and 36 each denote a subtractor for calculating the difference between two input signals, 37 denotes an adder/subtractor for performing addition and subtraction of three input signals.

The operation of the arrangement of FIG. 2 will be described below. Since the operations of elements 2a to 18a and 2b to 18b in FIG. 2 are the same as those in the prior art example of FIG. 1, explanation of them will be omitted.

In the present embodiment, the difference $\Delta\theta_{ra}$ (19a) between the ideal position deviation, $\theta_{ra}(2a) - \theta_{fa0}(18a)$ calculated by the subtractor 34a, and the actual position deviation, $\theta_{ra}(2a) - \theta_{fa}(14a)$, calculated by the subtractor 31a in the servo control system $1a_2$ for the first shaft, is calculated by the subtractor 35a. Similarly, the difference $\Delta\theta_{rb}$ (19b) between the ideal position deviation, $\theta_{rb}(2b) - \theta_{fb0}(18b)$, calculated by the subtractor 34b and the actual position deviation, $\theta_{rb}(2b) - \theta_{fb}(14b)$, calculated by the subtractor 31b in the servo control system $1b_2$ for the second shaft is calculated by the subtractor 35b.

Then, the discrepancy $\Delta\theta_{rs}(20)$ between the ideal/actual position deviation difference $\Delta\theta_{ra}$ (19a) in the first shaft and the ideal/actual position deviation difference $\Delta\theta_{rb}$ (19b) in the second shaft is calculated by the subtractor 36. Since the thus calculated discrepancy $\Delta\theta_{rs}$ (20) is the relative position error between the first and second shafts, the correction quantity is generated from the position error between the shafts. More specifically, the position error between the shafts $\Delta\theta_{rs}$ (20) is multiplied by the correction gain $K_{sb}$ (21) and thereby the correction quantity $\theta_{rs}$ (22) is obtained. The correction quantity $\theta_{rs}$ (22) is added to the speed command $V_{rb}$ (4b) for the second shaft as the subsidiary shaft by the adder/subtractor 37, and thus, the operation and response of the servomotor for the second shaft is adjusted to that of the servomotor for the first shaft as the main shaft, thereby achieving a synchronized superposed operation. More specifically, if there arises some difference between the operations and responses of the servomotors for the first and second shafts, the error $\Delta\theta_{rs}$ (20) between the shafts is generated, and hence, the operation of the second shaft as the subsidiary shaft is automatically corrected by the error and the correction gain $K_{sb}$ (21) so that the discrepancy $\Delta\theta_{rs}$ (20) is reduced. In other words, adjustments are made so that operations and responses of the first and second shafts are balanced. By the described method, occurrence of the error in the synchronized superposed operation of servomotors is greatly reduced as against that in the prior art and, thus, the method for error correction in a synchronized superposed operation of servomotors as one aspect of the present invention can be provided.

Figure 3:
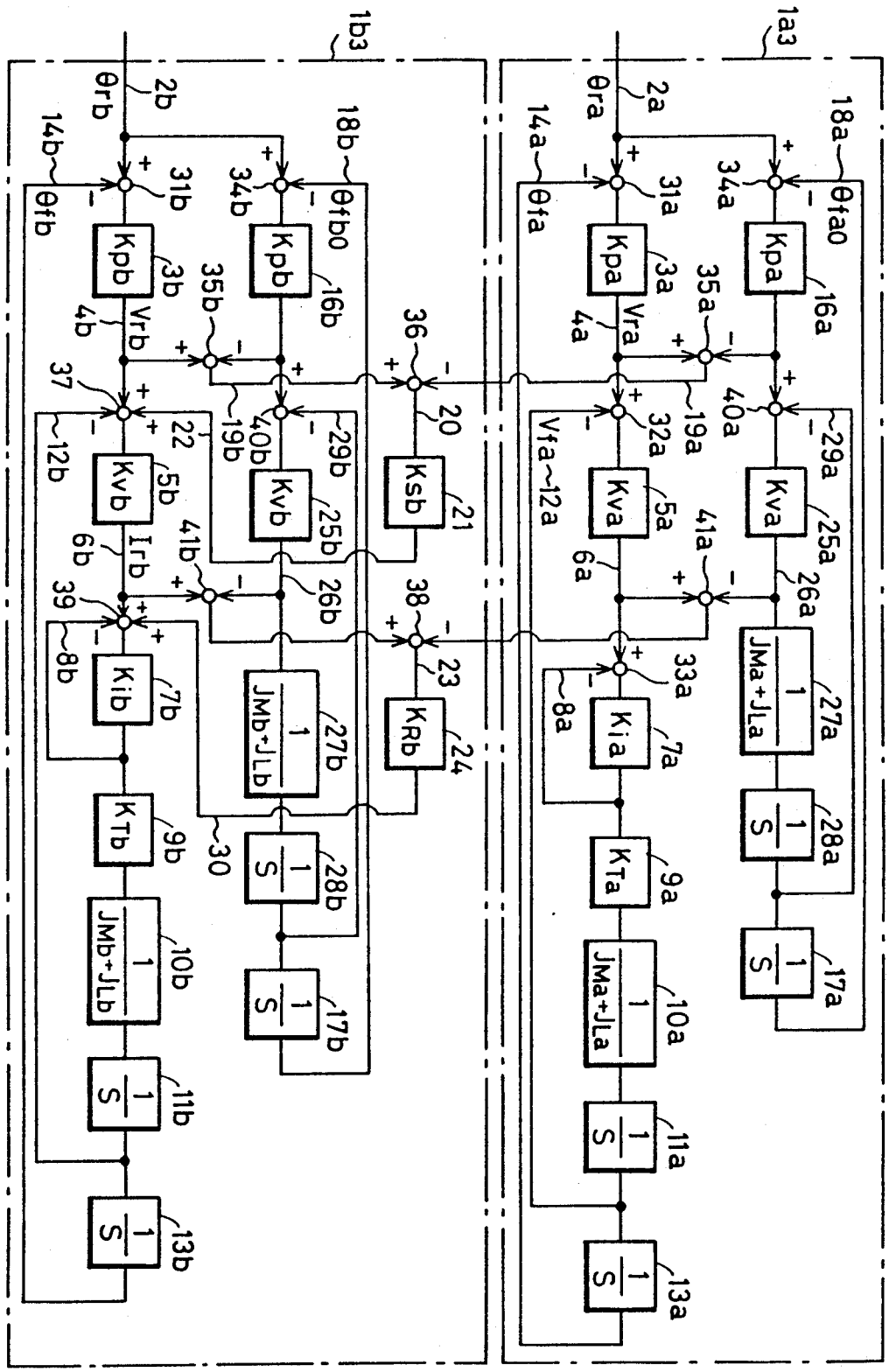
FIG. 3 is a block diagram of control systems for two shafts in a servomotor controller showing an embodiment of the present invention.

FIG. 3 is a block diagram of a control system for two shafts in a servomotor controller sh wing another embodiment of the present invention. Referring to the diagram, elements denoted by 2a to 19a, 2b to 19b, 20 to 22, 31a to 35a, 31b, 34b, 35b, 36, and 37 are like those denoted by corresponding reference characters in FIG. 2. Reference character $1a_3$ denotes the servo control system for the first shaft in the present embodiment, $1b_3$ denotes the servo control system for the second shaft in the present embodiment, 23 denotes a speed error between the first and second shafts, 24 denotes a correction gain $K_{Rb}$, 25a denotes a speed loop gain $K_{va}$ for the first shaft, 25b denotes a speed loop gain $K_{vb}$ for the second shaft, 26a denotes an ideal speed deviation of the first shaft, 26b denotes an ideal speed deviation of the second shaft, 27a denotes a motor load, $J_{Ma}+J_{La}$, for the first shaft, 27b denotes a motor load, $J_{Mb}+J_{Lb}$, for the second shaft, 28a denotes an integrating term for converting a current into a speed for the first shaft, 28b denotes a similar integrating term for the second shaft, 29a denotes an ideal speed of the first shaft, 29b denotes an ideal speed of the second shaft, 30 denotes a correction quantity obtained from the speed discrepancy between the first and second shafts, 38, 40a, 40b, 41a and 41b denote subtractors, and 39 denotes an adder/subtractor.

The operation of the arrangement of FIG. 3 will be described. Before describing the operation, the difference between FIG. 2 and FIG. 3 will be made clear. In the embodiment of FIG. 2, the differences between the ideal and actual position deviations were obtained as the ideal-actual deviation differences for the positions of the two shafts and, then, the correction quantity was obtained from the position error between the two shafts. But, it may be well to obtain, with regard to the speeds of the two shafts, the difference between the ideal and actual speed deviations. In other words, a better effect will be achieved by obtaining the differences between both the position and the speed deviations and performing the error correction using both the position and speed errors between the two shafts. FIG. 3 shows an example in which both the difference between the ideal-actual position deviations and the difference between the ideal-actual speed deviations are obtained and corrections are performed for both position and speed by using the errors between the two shafts.

The ideal-actual position deviation difference 19a of the first shaft is obtained from the subtractor 35a as the difference between the signal $(\theta_{ra} - \theta_{fa0})K_{pa}$, $\theta_{fa0}$ (18a) and the position command $\theta_{ra}$ (2a) obtained by the subtractor 34a and the position loop gain $K_{pa}$ (16a), and the signal $(\theta_{ra} - \theta_{fa})K_{pa}$, obtained by the subtractor 31a and the position loop gain $K_{pa}$ (3a). Here, in the case of FIG. 3, the input signals to the subtractor 35a are supplied from the output side of the position loop gains 16a and 3a, while, in the case of FIG. 2, the input signals to the subtractor 35a were supplied from the input side of the position loop gains 16a and 3a. However, in obtaining the ideal-actual position deviation difference, there is no substantial difference between the methods of FIG. 2 and FIG. 3. That is, the value obtained by multiplying the ideal-actual position deviation difference in FIG. 2 by the position loop gain $K_{pa}$ corresponds to the ideal-actual position deviation difference in FIG. 3, which only shows that there is a different calculating method from that in FIG. 2. Similarly, the ideal-actual position deviation difference 19b of the second shaft is obtained as the output of the subtractor 35b. Then, the position error 20 between the two shafts as the difference between the ideal-actual position deviation differences 19a and 19b for the first and second shafts is obtained by the subtractor 36 and the error is multiplied by the correction gain $K_{sb}$ (21) and thereby the correction quantity 22 is obtained.

The manner in which the correction quantity 22 is added to the speed command $V_{rb}$ (4b) by the adder/subtractor 37 for the second shaft as the auxiliary shaft is the same as that in the case of FIG. 2.

The ideal-actual speed deviation difference of the first shaft is obtained by the subtractor 41a as the difference between the signal $[(\theta_{ra} - \theta_{fa0})K_{pa} - V_{fa0}]K_{va}$, wherein $V_{fa0}$ is the ideal speed 29a, and the signal $(V_{ra} - V_{fa})K_{va}$, which is obtained by multiplying the difference between the actual speed $V_{fa}$ (12a) and the speed command $V_{ra}$ (4a) by the speed loop gain $K_{va}$ (5a). Similarly, the ideal-actual speed deviation difference of the second shaft is obtained as the output of the subtractor 41b. Then, the speed error 23 between shafts of the ideal-actual speed deviation differences of the first shaft and the second shaft is obtained by the subtractor 38 and this speed error is multiplied by the correction gan $K_{Rb}$ (24) and thereby the correction quantity 30 is obtained. This correction quantity 30 is added to the current command $I_{rb}$ (6b) by the adder/subtractor 39 for the second shaft as the auxiliary shaft.

In the described manner, corrections for the position and speed are respectively performed according to the errors between shafts of the ideal-actual position and speed deviation differences, and thus, a better synchronized superposed operation of servomotors can be performed.

As described so far, the present invention is arranged such that its two servomotors for the main shaft and the subsidiary shaft are each provided with a controller. The servomotor on the subsidiary shaft side is operated superposed on and synchronized with the servomotor on the main shaft side, such that a correction quantity calculated from the discrepancy between the ideal-actual position deviation differences of the two shafts is added to the speed command given to the subsidiary shaft side. Alternatively, in addition to the correction of the speed command by the position deviation correction quantity, the correction quantity calculated from the discrepancy between the ideal-actual speed deviation differences of the two shafts is added to the current command given to the subsidiary shaft side, and therefore, such good effects are obtained that occurrence of errors in the synchronized superposed operation of servomotors as described above is greatly reduced, so that highly accurate and effective operation control can be achieved.

The drawings are given above mainly by way of illustration and therefore are not limitative of the scope of the present invention.

What is claimed is:

1. A method for error correction in a synchronized superposed operation of servomotors for rotating respective shafts coupled to said servomotors, comprising the steps of:

obtaining an ideal position deviation of a main shaft based on a target position command for a controller of a servomotor coupled to said main shaft;

obtaining an actual position deviation of said main shaft based on an actual position of said main shaft;

calculating a difference between said ideal position deviation and said actual position deviation to thereby obtain a first position deviation difference;

obtaining an ideal position deviation of a subsidiary shaft based on a target position command for a controller of a servomotor coupled to said subsidiary shaft;

obtaining an actual position deviation of said subsidiary shaft based on an actual position of said subsidiary shaft;

calculating a difference between said ideal position deviation of said subsidiary shaft and said actual position deviation of said subsidiary shaft to thereby obtain a second position deviation difference;

calculating a speed correction quantity from a difference between said first position deviation difference and said second position deviation difference; and correcting a speed command in said subsidiary shaft controller as a function of said speed correction quantity.

2. A method for error correction in a synchronized superposed operation of servomotors for rotating respective shafts coupled to said servomotors, comprising the steps of:

obtaining an ideal position deviation of a main shaft based on a target position command for a controller of a servomotor coupled to said main shaft;

obtaining an actual position deviation of said main shaft based on an actual position of said main shaft;

obtaining an ideal speed deviation of said main shaft based on said target position command;

obtaining an actual speed deviation of said main shaft based on an actual speed of said main shaft;

calculating a difference between said ideal position deviation and said actual position deviation to thereby obtain a first position deviation difference;

calculating a difference between said ideal speed deviation and said actual speed deviation to thereby obtain a first speed deviation difference;

obtaining an ideal position deviation of a subsidiary shaft based on a target position command for a controller of a servomotor coupled to said subsidiary shaft;

obtaining an actual position deviation of said subsidiary shaft based on an actual position of said subsidiary shaft obtaining an ideal speed deviation of said subsidiary shaft based on said target position command for said controller of a servomotor coupled to said subsidiary shaft;

obtaining an actual speed deviation of said subsidiary shaft based on an actual speed of said subsidiary shaft;

calculating a difference between said ideal position deviation of said subsidiary shaft and said actual position deviation of said subsidiary shaft to thereby obtain a second position deviation difference; .

calculating a difference between said ideal speed deviation of said subsidiary shaft and said actual speed deviation of said subsidiary shaft to thereby obtain a second speed deviation difference;

calculating a speed correction quantity from a difference between said first position deviation difference and said second position deviation difference;

calculating a current correction quantity from a difference between said first speed deviation difference and said second speed deviation difference;

correcting a speed command in said subsidiary shaft controller as a function of said speed correction quantity; and correcting a current command in said subsidiary shaft controller as a function of said current correction quantity.

* * * * *

UNITED STATES PATENT AND TRADEMARK OFFICE
CERTIFICATE OF CORRECTION

PATENT NO. : 5,083,074
DATED : January 21, 1992
INVENTOR(S) : Hironori Suzuki et al.

It is certified that error appears in the above-identified patent and that said Letters Patent is hereby corrected as shown below:

Column 2, line 19, delete "$V_{fa} - V_{fa},$".

Column 3, line 45, delete "droop", and insert --deviation--.

Column 4, line 36, delete "3", and insert --2--.

Column 6, line 28, delete "$\theta_{fa0}$ (18a)".

Column 6, line 29, delete "and the position command $\theta_{ra}(2a)$".

Column 7, line 3, delete "gan", and insert --gain--.

Signed and Sealed this

Twenty-first Day of September, 1993

Attest:

BRUCE LEHMAN

*Attesting Officer*  *Commissioner of Patents and Trademarks*